(12) United States Patent  (10) Patent No.: US 12,386,821 B1
Di Somma et al.  (45) Date of Patent: Aug. 12, 2025

(54) NATURAL LANGUAGE SEARCH OF NON-INDEXED DATA

(71) Applicant: SAP SE, Walldorf (DE)

(72) Inventors: Simone Di Somma, Rome (IT); Giuseppe Ancona, Rome (IT); Geoffrey Peters, Vancouver (CA); Ka-Lok Fung, Surrey (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/796,425

(22) Filed: Aug. 7, 2024

(51) Int. Cl.
*G06F 7/00* (2006.01)
*G06F 16/242* (2019.01)
*G06F 16/248* (2019.01)

(52) U.S. Cl.
CPC .......... *G06F 16/243* (2019.01); *G06F 16/248* (2019.01)

(58) Field of Classification Search
CPC ............. G06F 16/2425; G06F 16/2428; G06F 16/2455; G06F 16/248; G06F 16/243; G06F 16/14; G06F 16/38; G06F 16/24578; G06F 16/245; G06F 16/2477; G06F 16/287; G06F 40/56; G06F 40/205; G06F 40/40; G06F 3/0482; G06F 3/04883
See application file for complete search history.

(56) References Cited

U.S. PATENT DOCUMENTS

| 9,953,372 | B1* | 4/2018 | Dziabiak | G06Q 30/02 |
| 10,380,771 | B2* | 8/2019 | Zhao | G06F 16/283 |
| 2016/0179922 | A1* | 6/2016 | Crupi | G06F 16/243 |
|  |  |  |  | 707/737 |
| 2017/0193116 | A1* | 7/2017 | Wong | G06F 16/248 |
| 2020/0134067 | A1* | 4/2020 | Villard | G06F 16/243 |
| 2021/0165828 | A1* | 6/2021 | Xiang | G06F 16/283 |

* cited by examiner

*Primary Examiner* — Mohammad A Sana
(74) *Attorney, Agent, or Firm* — Buckley, Maschoff & Talwalkar LLC

(57) ABSTRACT

Systems and methods include receiving a natural language query to search a data model, determining a plurality of dimensions, a plurality of measures and, for each of the plurality of dimensions, a sample of dimension members, transmitting the natural language query, the plurality of dimensions, the plurality of measures and the sample of dimension members to a text generation model, receiving a candidate dimension member, one or more matching measures and zero or more matching dimensions are also typically received from the text generation model, determining whether the candidate dimension member is a dimension member of the data model, generating a second query including the candidate dimension member and the matching measure, transmitting the second query to the data model, receiving a visualization including a result set, and presenting the visualization.

20 Claims, 15 Drawing Sheets

NATURAL LANGUAGE SEARCH OF NON-INDEXED DATA

BACKGROUND

Modern organizations store vast amounts of data across one or more data sources. Each data source may employ a data model which defines a logical structure and semantics of its stored data. A data model may include entities such as measures and dimensions. Measures are quantitative values to which calculations (e.g., sum, count, average, minimum, maximum) may be applied. Examples of measures include instrument readings, sales data, cost data, and budget data. Dimensions are qualitative fields that can be used for filtering or grouping measures, such as names, dates, and geographical data.

Data is requested from a data source in terms of the entities of its data model. For example, a data source may be queried for Sales of Running Shoes within North America during 2023. In this query, Sales is a measure, Running Shoes is a dimension member of the Product dimension, North America is a dimension member of the Geography dimension, and 2023 is a dimension member of the Time dimension. Querying a data source therefore requires knowledge of the entities of its data model.

Traditional data querying systems rely on data model-specific indices to identify entities of a data model which match strings of user-inputted queries. For example, a user may input "Italy Profit Q1 2022" into a querying system in order to search a particular data model for desired data. The system searches an index corresponding to the data model based on the input, and the index returns a response indicating that Italy is a member of the Country dimension, Profit is a measure, and Q1 2022 is a member of the Date dimension. The querying system then uses this information to build a query to search the data model.

Traditional systems therefore require indexing (or "curating") of data models prior to searching thereof. A data model is indexed by determining measure names, dimension names and dimension members of the data model and transmitting this data to an indexing component for creation and storage of a corresponding index. The volume of data is typically large and therefore transmission of the data to create or to update an index is rather resource- and time-consuming. These issues are exacerbated if the data model is on-premise and the index is cloud-based. Moreover, a cloud-based indexing component may encounter security-related difficulties when attempting to access data which is stored on-premise.

What is needed are systems to efficiently query a data model without requiring prior knowledge or an index of the entities of the data model.

DETAILED DESCRIPTION

The following description is provided to enable any person in the art to make and use the described embodiments. Various modifications, however, will be readily-apparent to those in the art.

Some embodiments facilitate determination of dimension members of a data model which correspond to an input natural language query. This determination may be used to query the data model for results which the natural language query intends to elicit.

Briefly, a data model to be searched is identified and metadata of the model is acquired. The metadata includes member names and dimension names of the data model. Next, a sampling of dimension members for each dimension of the data model is acquired.

A natural language query is also received which describes information desired from the data model. A service receives the data acquired from the data model and the natural language query, and uses a text generation model to return zero or more matching measures, zero or more measures dimensions, and zero or more candidate dimension members, as well as other information which defines a visualization. The candidate dimension members are then looked up in the data model to determine whether they exist in the data model. If so, the data model returns unique identifiers of the candidate dimension members, and the identifiers are used along with the other information returned by the service to build a query to retrieve desired data and generate a visualization of the data. Advantageously, some embodiments allow a user to efficiently and effectively query a data model with a natural language query without requiring prior knowledge of, or an index of, the entities of the data model.

Figure 1:
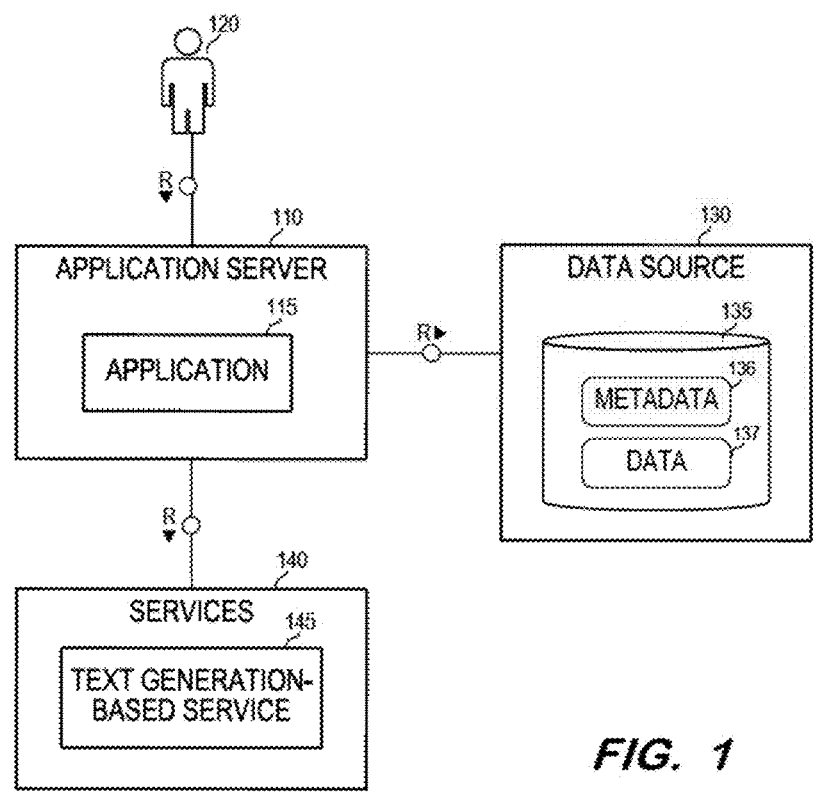
FIG. 1 is a block diagram of an architecture to perform a natural language search of a non-indexed data model according to some embodiments.

FIG. 1 is a block diagram of an architecture to perform a natural language search of a non-indexed data model according to some embodiments. Each of the illustrated components may be implemented using any suitable combination of on-premise, cloud-based, distributed (e.g., including distributed storage and/or compute nodes) computing hardware and/or software that is or becomes known. Each computing system described herein may comprise one or more physical and/or virtualized servers.

Two or more components of FIG. 1 may be co-located. In some embodiments, two or more components are implemented by a single computing device. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Application server 110 may comprise one or more servers, virtual machines, clusters of a container orchestration system, etc. Application server 110 may provide an operating system, services, I/O, storage, libraries, frameworks, etc. to applications executing therein. Application 115 may comprise program code executable by one or more processing units to provide functions to users such as user 120.

According to some embodiments, user 120 operates a client-side application executing on a user device (not shown) to issue requests to application 115 and receive responses therefrom. For example, the client-side application may comprise a front-end UI application which is associated with application 115 and which executes within a Web browser executed by the user device. User 120 may provide credentials to application 115 for access thereto as is known in the art. In some embodiments, application 115 is a mobile application or a desktop application, and application server 110 is a user device such as a smartphone, laptop computer or desktop computer.

User 120 may request information and/or visualizations based on stored data of data source 130. Data source 130 may comprise any on-premise and/or cloud-based data storage system such as but not limited to a database system, a data warehouse, and another application server. Data source 130 may be partially or fully remote from application server 110, and may be distributed as is known in the art.

Data storage system 135 of data source 130 which may consist of any type of standalone or distributed data storage systems that are or become known, including but not limited to fixed disks, Flash memory, read-only memory and non-volatile random-access memory. Data storage system 135 stores metadata 136 and data 137 as is known in the art. Metadata 136 may include database table names, table column names (e.g., Address, Sales) and a data schema defining dimensions, measures, mappings thereof to database tables, and logical relationships between database tables. As is known in the art, one or more dimensions of the schema may comprise a hierarchical dimension which itself consists of a hierarchical tree of dimensions.

Data 137 may comprise tabular data stored in a columnar or row-based format, object data or any other type of data that is or becomes known. Data 137 may include specific instances of the dimensions (i.e., dimension members) and measures (i.e., values) defined in metadata 136. In one simple example, data 137 may comprise a database table in which each row includes a dimension member of the dimension Country, a dimension member of the dimension Product, and a value of the measure Sales. Accordingly, a query of the database table including a particular country and product (e.g., France, Shoes) may return the value of Sales within the row including the dimension members France and Shoes.

Metadata 136 and data 137 may include metadata and data of multiple tenants as is known in the art. Application 115 may be configured to return only data of the tenant associated with requesting user 120. Tenant-specific data may be identified within data 137 using tenant-specific identifiers. In some embodiments, application 115 is a multi-tenant application which leverages such tenant-specific identifiers within its queries of data source 130. Embodiments may be implemented in other types of multi-tenant architectures.

Services 140 may be implemented by one or more on-premise or cloud-based servers. Services 140 may include text generation-based service 145. Text generation-based service 145 may comprise a neural network trained to generate text based on input text. Non-exhaustive examples of such a network include GPT-4, LaMDA, and Claude. The network may be publicly available or deployed within a landscape which is trusted by a provider of services 140. The network may be trained based on public and/or private data.

During operation, user 120 may input a natural language query into an interface provided by application 115 and identify a data model (i.e., a set of metadata and corresponding data) to be searched. Application 115 queries data source 130 for metadata of the data model and the metadata is received therefrom. The metadata includes member names and dimension names of the data model. Next, application 115 uses the dimension names to retrieve a sampling of dimension members for each dimension of the data model from data source 130.

Application 115 transmits data including the metadata, the natural language query, and the sampling of dimension members to text generation-based service 145. Based on this received data, service 145 may determine zero or more measures and/or zero or more dimensions which match strings of the natural language query (i.e., "matching" measures and "matching" dimensions), as well as other information defining a query result visualization. A matching measure refers to a measure itself (such as "Sales Amount", "Amount of Taxes", or "Count of Employees") that exists in the selected data model, and a matching dimension refers to a dimension that exists in the selected data model (such as a dimension named "Country").

Service 145 may also identify zero or more "candidate" dimension members. A candidate dimension member refers to a dimension member such as "Hot Chocolate" which might be a member of a dimension of the data model (i.e., a candidate dimension member) such as "Product name". An identified candidate dimension member is not necessarily a dimension member of the candidate dimension in the data model.

For example, service 145 may identify and return a matching measure, two matching dimensions and no candidate dimension members, or two measures, three candidate dimension members and no matching dimensions. In another example, service 145 may return one matching measure, and no matching dimensions or candidate dimension members. In still another example, service 145 returns no measures and two candidate dimension members.

Application 115 performs a lookup of any returned candidate dimension members (e.g., is "Hot Chocolate" member of the "Product name" dimension?) in data source 130 to determine whether the candidate dimension members exist in the data source and their corresponding unique identifiers (i.e., IDs) within the data source. Application 115 may then build a query to acquire the desired results and visualization using the IDs, IDs of any matching measures and matching dimensions returned from service 145, and the information returned from service 145. Application 115 transmits the query to data source 130 and receives the visualization in return, which is then presented to user 120.

Figure 2A:
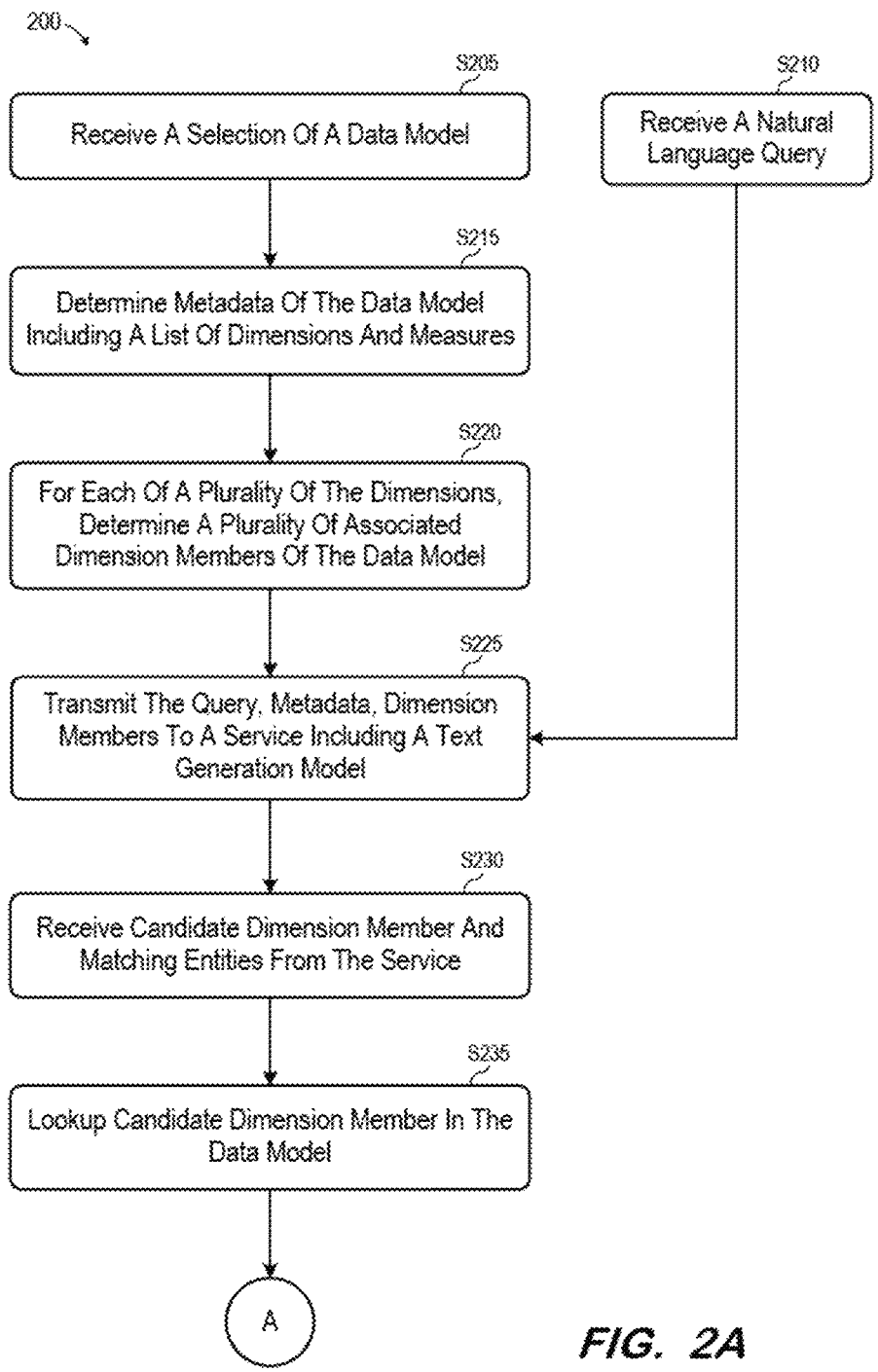
FIGS. 2A and 2B comprise a flow diagram of a process to perform a natural language search of a non-indexed data model according to some embodiments.
Figure 2B:
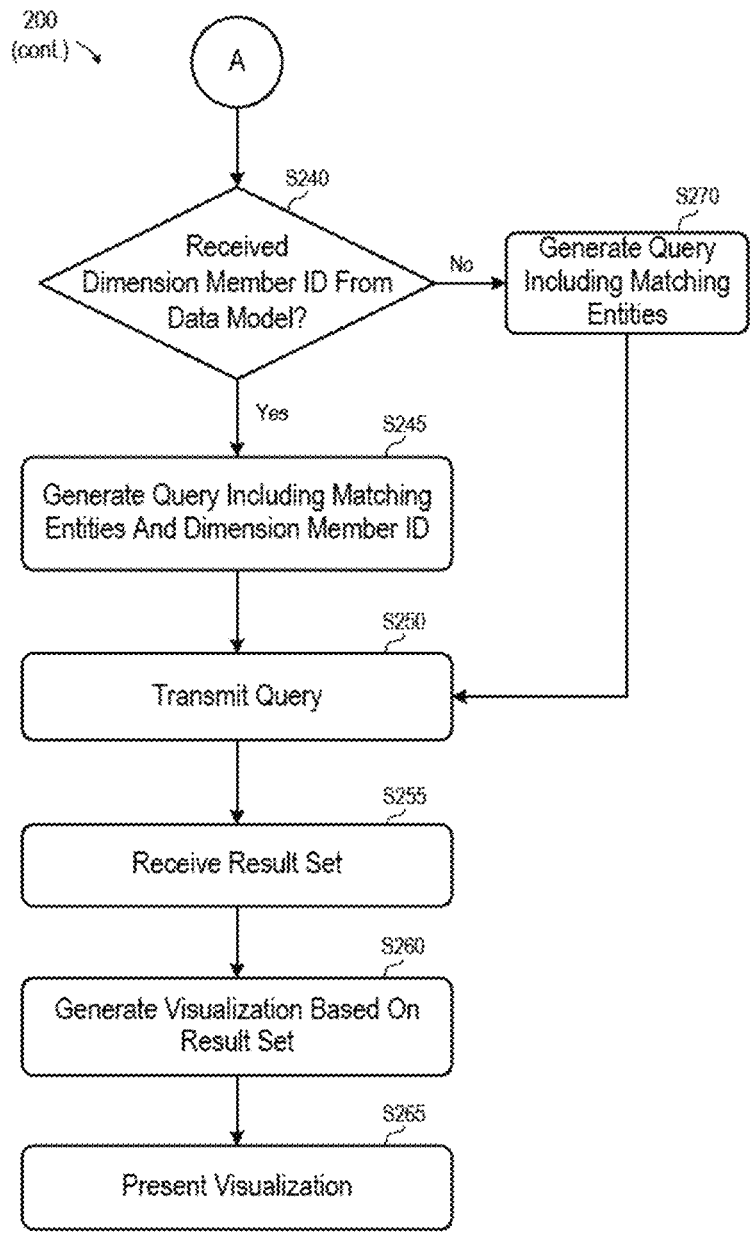

FIGS. 2A and 2B comprise a flow diagram of process 200 to perform a natural language search of a non-indexed data model according to some embodiments. Process 200 and the other processes described herein may be performed using any suitable combination of hardware and software. Program code embodying these processes may be stored by any one or more non-transitory tangible media, including but not limited to a fixed disk, a volatile or non-volatile random-access memory, a DVD, a Flash drive, and a magnetic tape, and executed by any one or more processing units, including but not limited to a processor, a processor core, and a processor thread. Embodiments of process 200 are not limited to the examples described below.

A selection of a data model is received at S205. As described above, a data model is defined herein as a set of metadata describing semantics and structure of data, and the data itself. A single data source (e.g., a database system) may store more than one data model.

Figure 3:
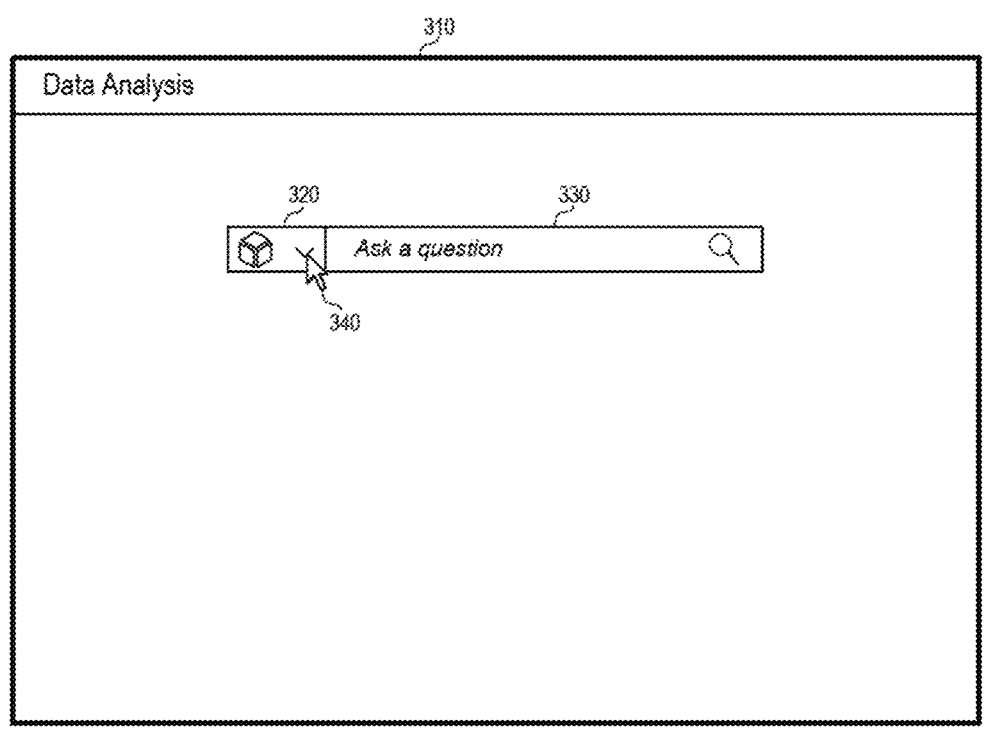
FIGS. 3-7 illustrate user interfaces for receiving a natural language query of a data model according to some embodiments.

The selection may be received from a user via a user interface such as interface 310 of FIG. 3. Embodiments are not limited to interface 310. Interface 310 may comprise an interface of application 115 according to some embodiments. In one example, user 120 executes a Web browser to access application 115 via HyperText Transfer Protocol and to receive user interface 310 in return.

Figure 4:
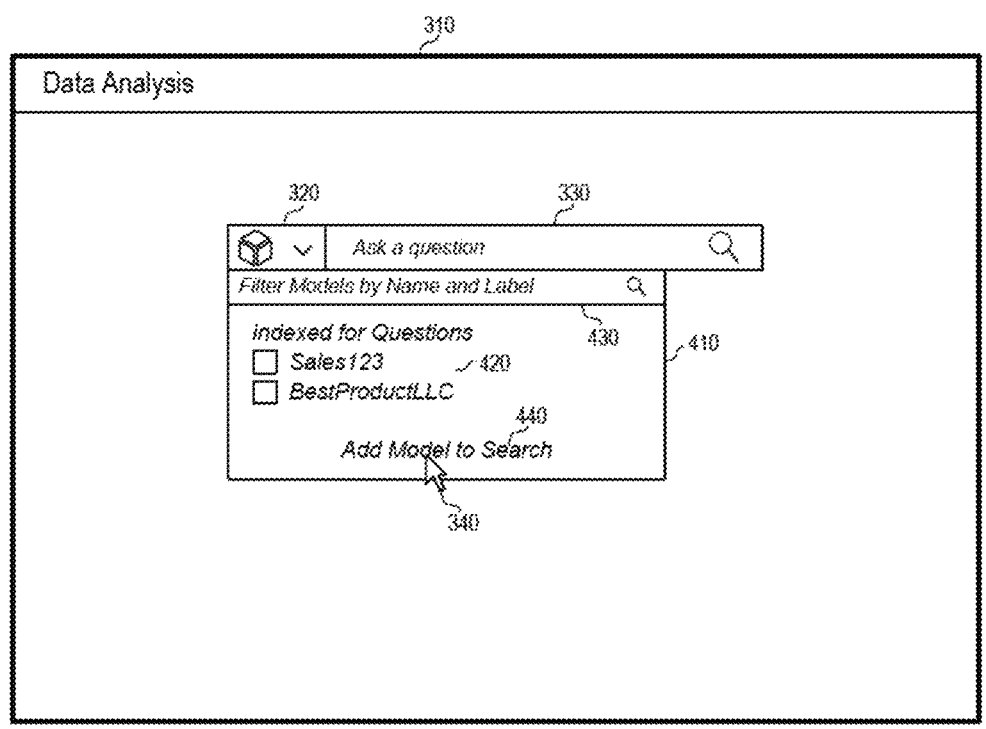

User interface 310 includes drop-down menu 320 for selecting a data model and input field 330 for inputting a natural language query. In the illustrated example, user 120 operates cursor 340 to expand drop-down menu 320, resulting in display of menu 410 of FIG. 4. Menu 410 lists selectable data models 420 and includes search field 430 for filtering the list of models 420. Each of selectable data models 420 is associated with a checkbox which may be selected to select a data model to search. In some embodiments, more than one data model may be selected for search.

Figure 5:
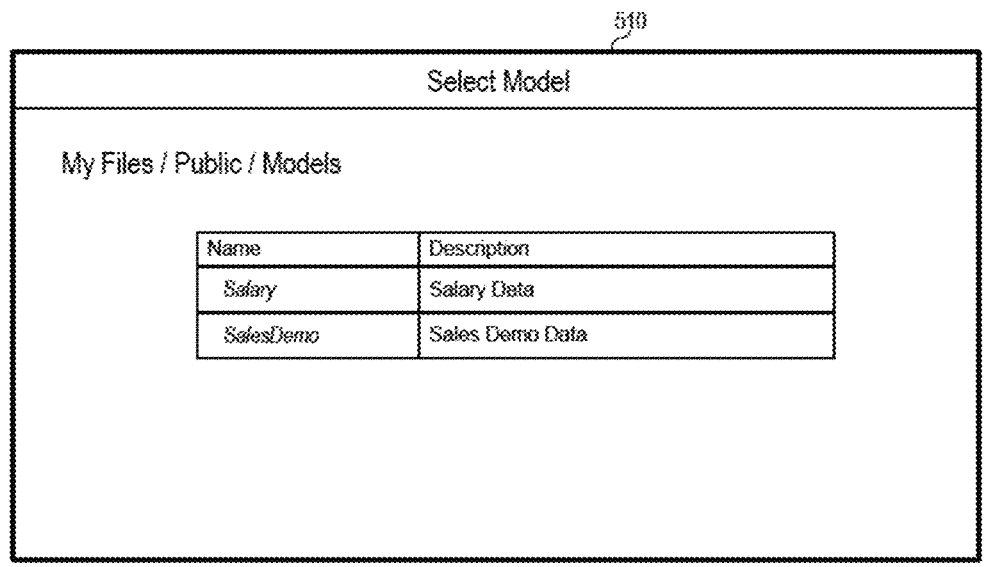
Figure 6:
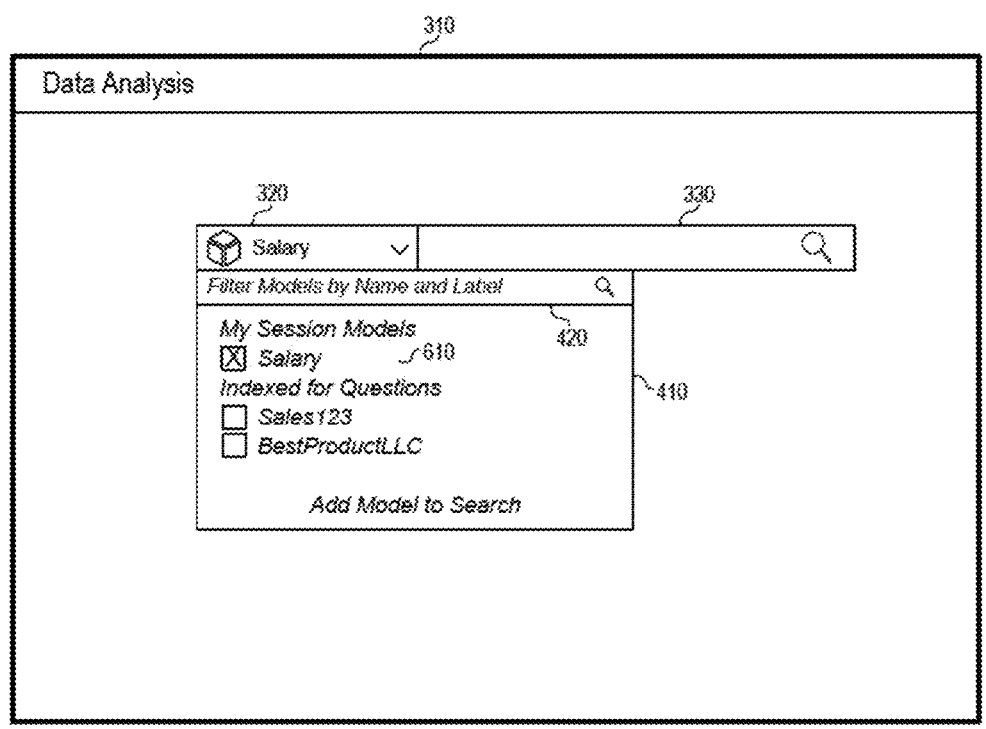

Models 420 are indicated as "Indexed for Questions". Models 420 may therefore be searched using an index of their metadata and dimension members as described in the above Background. "Add Model to Search" link 440 allows a user to select data models which are not listed in menu 410. As shown, cursor 340 can be used to select link 440, resulting in display of Select Model dialog 510 of FIG. 5. It will be assumed that the data model named Salary is selected from dialog 510. FIG. 6 illustrates interface 310 after selection of the Salary data model. Menu 410 and drop-down menu 320 now include Salary data model 610 and indicate that Salary data model 610 has been selected.

Figure 7:
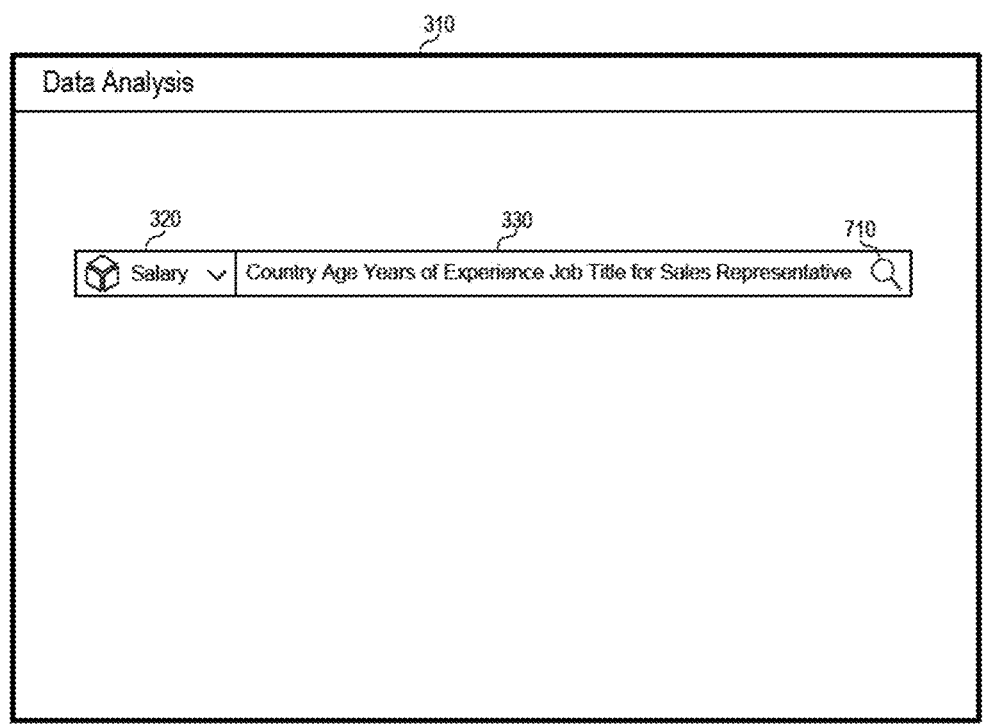

A natural language query is received at S210. FIG. 7 illustrates a natural language query "Country Age Years of Experience Job Title for Sales Representative" input by a user into input field 330. S210 may occur before or after S205. In some embodiments, S215 and S220 are performed after S205, regardless of when S210 is performed. In other words, S210 may be performed before and/or in parallel with S205, S215 and S220.

Figure 8:
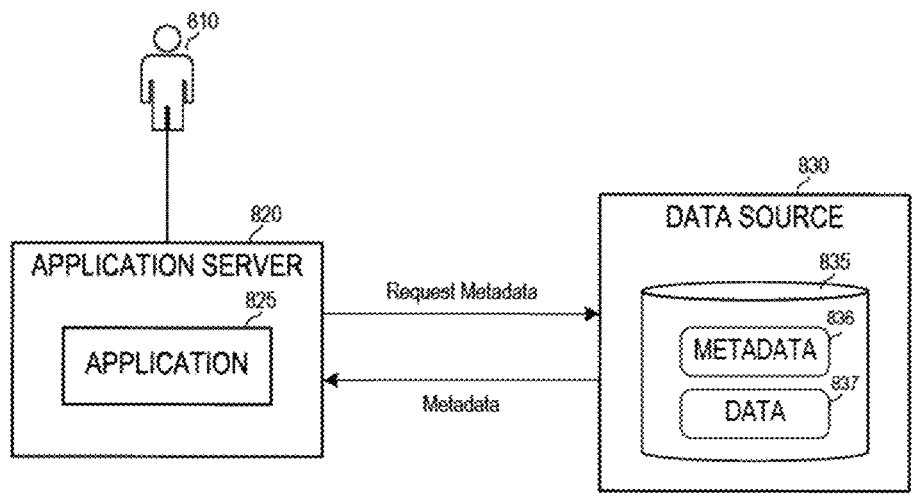
FIG. 8 illustrates communication between an application and a data source to determine data model metadata according to some embodiments.

At S215, metadata of the selected data model is determined. For example, as illustrated in FIG. 8, and in response to selection of a data model by user 810, application 825 of application server 820 transmits a request for metadata of the selected data model using a connection of user 810 to data source 830. In this regard, data source 830 is known to store the selected data model in metadata 836 and data 837 of data storage system 835. Data source 830 returns metadata of the data model to application 825 in response. The metadata includes measure names and dimension names of the data model and may also include additional data such as but not limited to hierarchies and currencies. Determination of the metadata at S215 may include more than one call to more than one service of data source 830.

Figure 9:
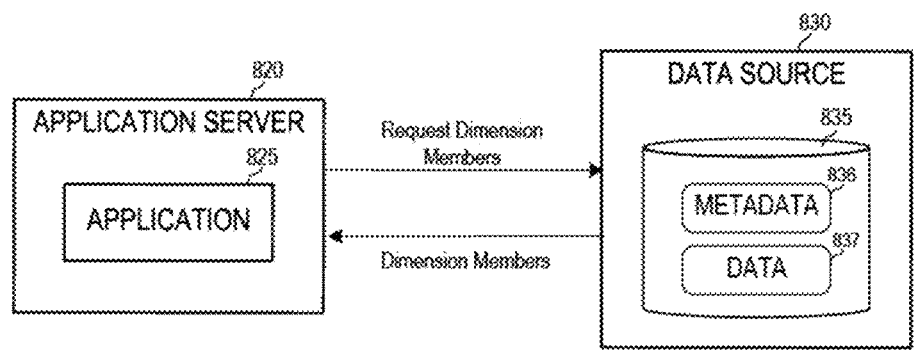
FIG. 9 illustrates communication between an application and a data source to determine a sample of dimension members according to some embodiments.

Next, at S220, a plurality of dimension members associated with each dimension of the data model are determined. The dimension members may be requested from data source 830 as shown in FIG. 9. According to some embodiments, S220 includes requesting a particular number (e.g., three) different dimension members of each dimension determined at S215. For example, the request may be a request for the first three unique members of each dimension, a request for three members located in random rows of each dimension, etc.

S225 is performed after both S220 and S210 have been performed. With reference to FIG. 7, S225 may be performed once menu 320 and input field 330 are populated and search icon 710 is selected. At S225, the natural language query, metadata, and dimension members are transmitted to a service including a text generation model. In response, zero or more matching measures, zero or more matching dimensions, and zero or more candidate dimension members are received from the service at S230. A received candidate dimension member may be specified by the name of the candidate dimension member and a name of a dimension of the data model of which the candidate dimension member may be a member.

Figure 10:
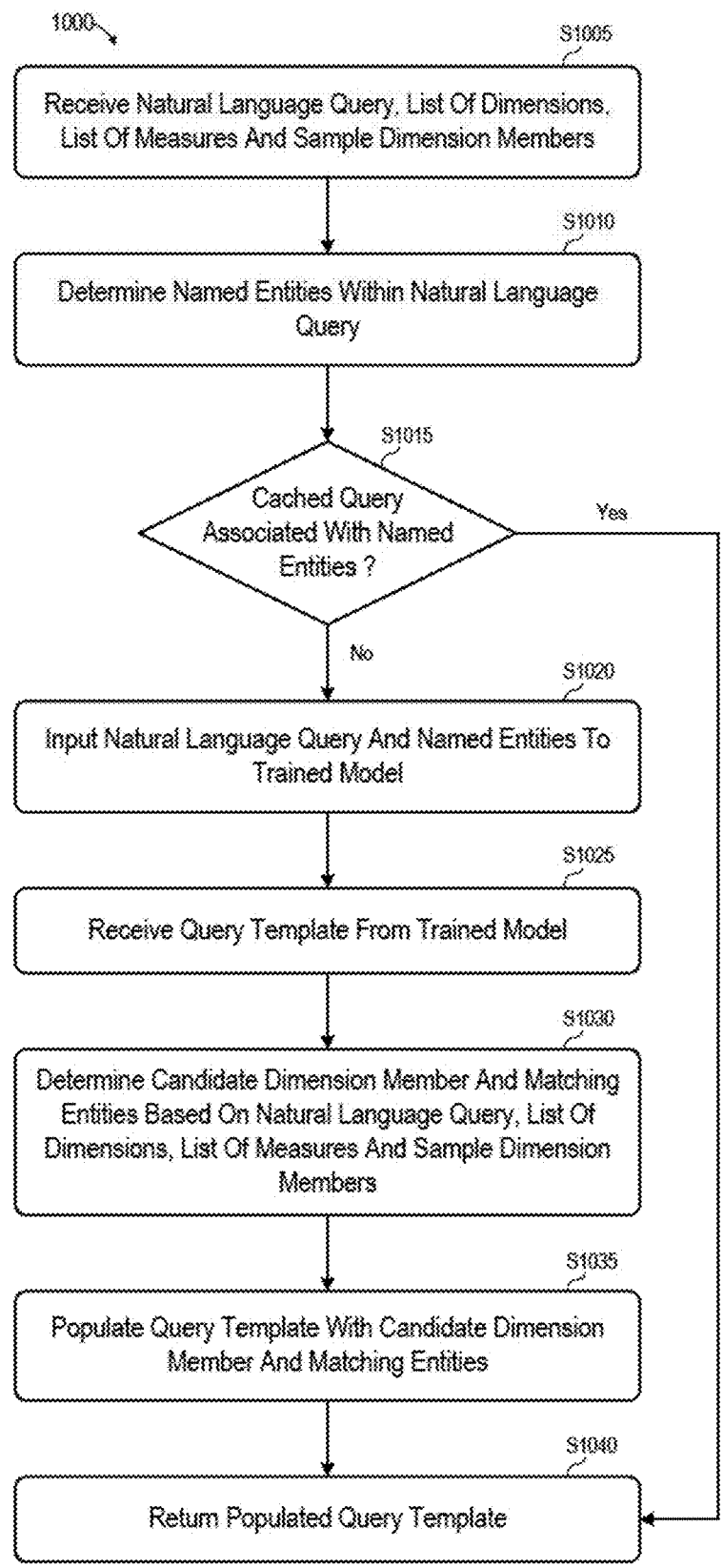
FIG. 10 is a flow diagram of a process to determine one or more candidate measures and candidate dimension members based on a natural language query according to some embodiments.
Figure 11:
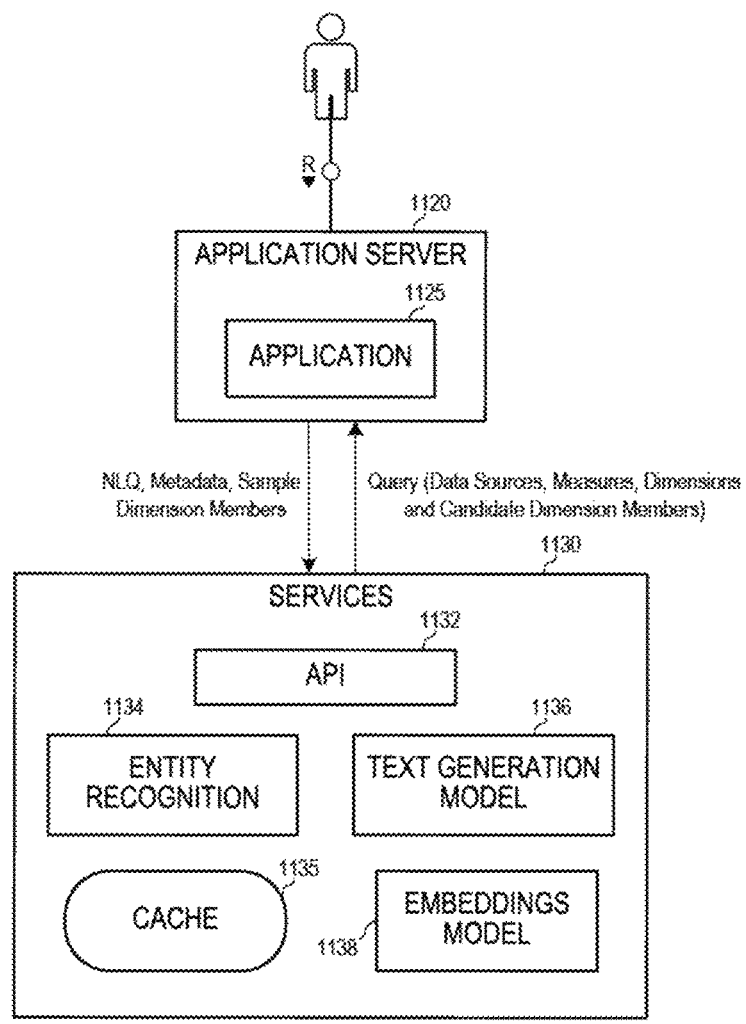
FIG. 11 is a block diagram of a service to determine one or more candidate measures and candidate dimension members based on a natural language query according to some embodiments.

FIG. 10 is a flow diagram of process 1000 to determine candidate dimension members based on a natural language query. In some embodiments, process 1000 may be performed by a service in response to receipt of the natural language query, metadata, and dimension members transmitted at S225. FIG. 11 is a block diagram of a service to perform process 1000, but embodiments of process 1000 are not limited thereto.

Initially, a natural language query, list of dimensions, list of measures and sample dimension members are received at S1005. The natural language query, list of dimensions, list of measures and sample dimension members may have been determined as described above. FIG. 11 illustrates transmission of a natural language query, metadata including dimensions and measures, and sample dimension members from application 1125 of application server 1120 to services 1130. Application 1125 and application server 1120 may implement any of the functions described above with respect to applications 115, 825 and application servers 110, 820.

The natural language query, list of dimensions, list of measures and sample dimension members may be received at S1005 in any suitable format. According to some embodiments, this information is transmitted within a JavaScript Object Notation (JSON) payload. The payload may be transmitted to services 1130 via a call to an Application Programming Interface (API) such as API 1132.

At S1010, named entities within the natural language query are determined. Services 1130 include entity recognition component 1134, which may comprise program code of any entity recognition system that is or becomes known. For example, given the natural language query "Country Age Years of Experience Job Title for Sales Representative", the entities "Country", "Age", "Years", "Years of Experience", "Job Title", "Title", "Sales" and "Sales Representative" may be determined at S1010.

At S1015, it is determined whether a query template has been previously determined and cached based on the determined named entities. For example, cache 1135 may store query templates which were previously determined according to process 1000, each in association with a data model and a set of named entities used to determine the query template. Assuming that cache 1135 does not include query templates associated with the Salary data model and the named entities "Country", "Age", "Years", "Years of Experience", "Job Title", "Title", "Sales" and "Sales Representative", flow proceeds to S1020.

The natural language query and named entities are input to a trained text generation model at S1020. For example, text generation model 1136 may comprise a large language model (LLM) as is known in the art.

Text generation model 1136 may be implemented by, for example, executable program code, a set of hyperparameters defining a model structure and a set of corresponding weights, or any other representation of an input-to-output mapping which was learned as a result of the training. According to some embodiments, model natural language query and named entities are input is a large language model (LLM) conforming to a transformer architecture. A transformer architecture may include, for example, embedding layers, feedforward layers, recurrent layers, and attention layers. Generally, each layer includes nodes which receive input, change internal state according to that input, and produce output depending on the input and internal state. The output of certain nodes is connected to the input of other nodes to form a directed and weighted graph. The weights as well as the functions that compute the internal states are iteratively modified during training.

An embedding layer creates embeddings from input text, intended to capture the semantic and syntactic meaning of the input text. A feedforward layer is composed of multiple fully-connected layers that transform the embeddings. Some feedforward layers are designed to generate representations of the intent of the text input. A recurrent layer interprets the tokens (e.g., words) of the input text in sequence to capture the relationships between the tokens. Attention layers may employ self-attention mechanisms which are capable of considering different parts of input text and/or the entire context of the input text to generate output text.

Text generation model 1136 may be trained (i.e., fine-tuned) based on training data to receive a prompt including a natural language query and named entities and to output a query template. Accordingly, a query template is received from the trained model at S1025. A query template represents a query but includes placeholders for certain entities of the query, such as certain measures, dimensions and dimension members. The query template may specify visualization parameters including but not limited to sort order, a visualization type, etc.

Next, at S1030, candidate dimension members and other matching entities are determined based on the named entities and the received list of dimensions, list of measures and sample dimension members. Generally, S1030 determines whether the named entities of the natural language query match any measures and/or dimensions of the data model. The determination of matching measures and/or dimensions of the data model may utilize text matching algorithms S1030 also determines any candidate dimension members of the data model. This determination may utilize embeddings model 1138. For example, embeddings model 1138 may be used to generate embeddings of each named entity of the natural language query. The generated embeddings represent the semantic meaning of each named entity, such that named entities which are closer in semantic meaning will have embeddings which are closer in vector space. The generated embeddings are compared with embeddings of the sample dimension members to identify any semantically-similar dimension members and, by extension, their corresponding dimensions. The determination of measures and/or dimensions of the data model may also utilize embeddings model 1138 in some embodiments. In the present example, it is assumed that "Sales Representative" is determined to be a candidate dimension member of the "Job Title" dimension of the data model.

The query template is populated at S1035 with matching entities determined at S1030 and, if a candidate dimension member has been determined, a candidate filter for each candidate dimension consisting of a candidate dimension member and its corresponding dimension. The populated query template is returned to application 1125 at S1040. The populated query template may comprise a JSON payload of a response to the received API call.

Figure 12:
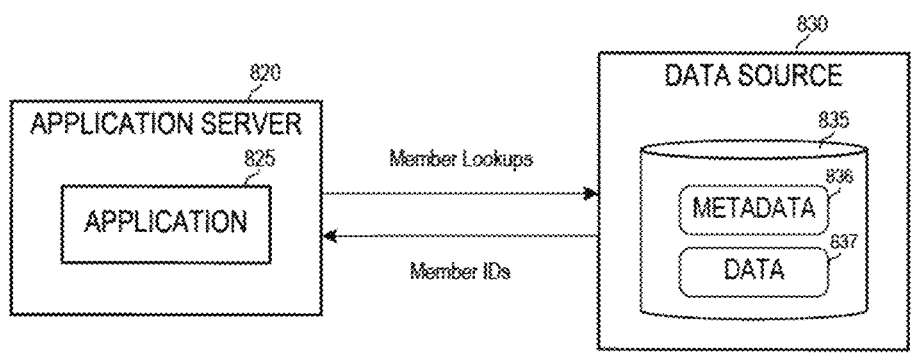
FIG. 12 illustrates communication between an application and a data source to determine identifiers of candidate dimension members according to some embodiments.

Returning to process 200, a lookup of the data model is performed for any candidate dimension members at S235. FIG. 12 illustrates application 825 requesting a lookup of the candidate dimension members based on their corresponding dimensions. Continuing the present example, S235 may comprise a lookup of whether the "Sales Representative" member exists in the "Job Title" dimension. At S240, it is determined whether data source 830 has responded with an ID of the looked-up dimension members. If a looked-up dimension member is not a dimension member of its corresponding dimension, no ID is returned for that dimension member.

Figure 13:
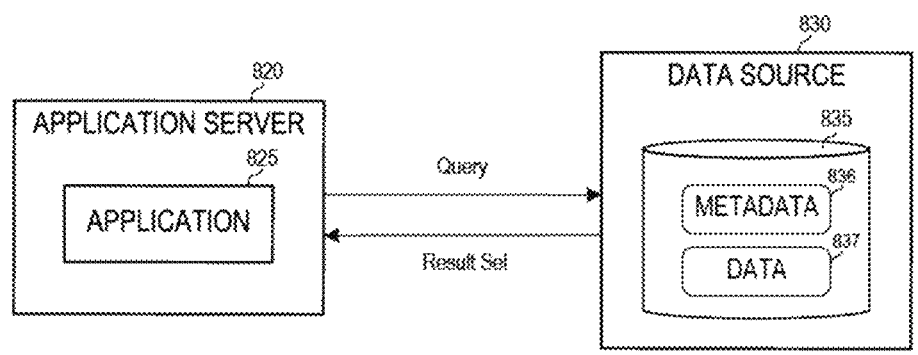
FIG. 13 illustrates communication between an application and a data source to query the data source based on the determined identifiers and one or more candidate measures according to some embodiments.

A query is generated at S245. The query includes the returned lookup IDs and IDs of any matching measures and dimensions, and is structured according to the populated query template. The query is transmitted to the data source for querying the data model at S250, and a result set is received at S255. FIG. 13 illustrates transmission of a query from application 825 to data source 830 and return of a result set according to some embodiments.

A visualization is generated at S260 based on the result set. The visualization may be generated by application 825 based on information specified in the populated query template. In some embodiments, data source 830 returns a visualization in response to the query transmitted at S250. The visualization may be formatted in any suitable manner, including according to a UI framework.

Figure 14:
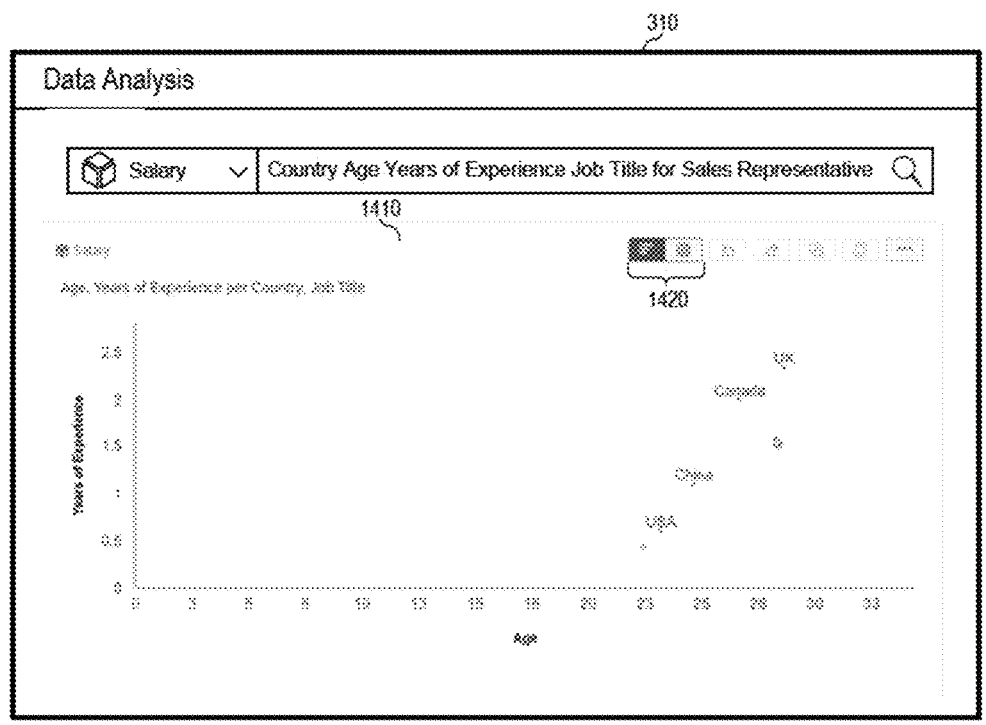
FIG. 14 is a user interface presenting a visualization according to some embodiments.

The visualization is presented to the user at S265. The visualization may be transmitted to a client application and constructed for display thereby based on a UI framework supported by the client application. FIG. 14 shows user interface 310 including visualization 1410 according to some embodiments. Visualization 1410 includes controls 1420 for switching between different visualization types (e.g., chart, table).

Figure 15:
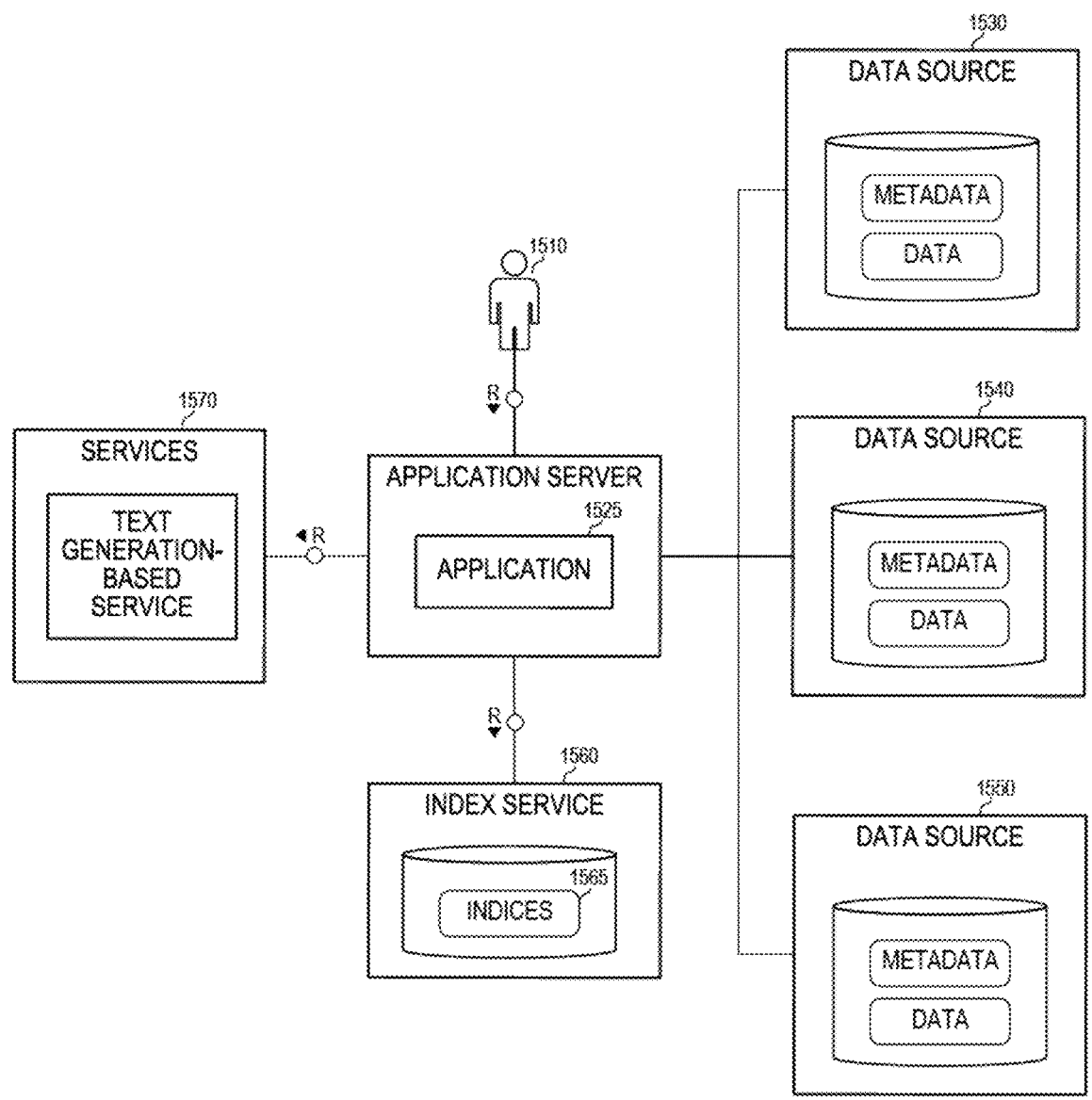
FIG. 15 is a block diagram of an architecture providing natural language search of indexed and non-indexed data models according to some embodiments.

FIG. 15 is a block diagram of an architecture providing natural language search of indexed and non-indexed data models according to some embodiments. User 1510 may interact with application 1525 to select one or more data models to search. For example, data source 1530 may store a non-indexed data model. If a data model of data source 1550 is selected, application 1525 calls data source 1530 and services 1570 as described with respect to process 200 to generate a query and present a visualization.

User 1510 may also select an indexed data model stored in one of data sources 1540 and 1550. For example, indices 1565 of index service 1560 index the metadata entities of the indexed data model. Indices 1565 therefore allow fast determination of whether strings of an input natural language query represent metadata entities of the selected data model. Accordingly, if an indexed model is selected, application 1525 calls index service 1560 to search indices 1565 for entities of the input natural language query, and constructs a query based on the identified entities.

Figure 16:
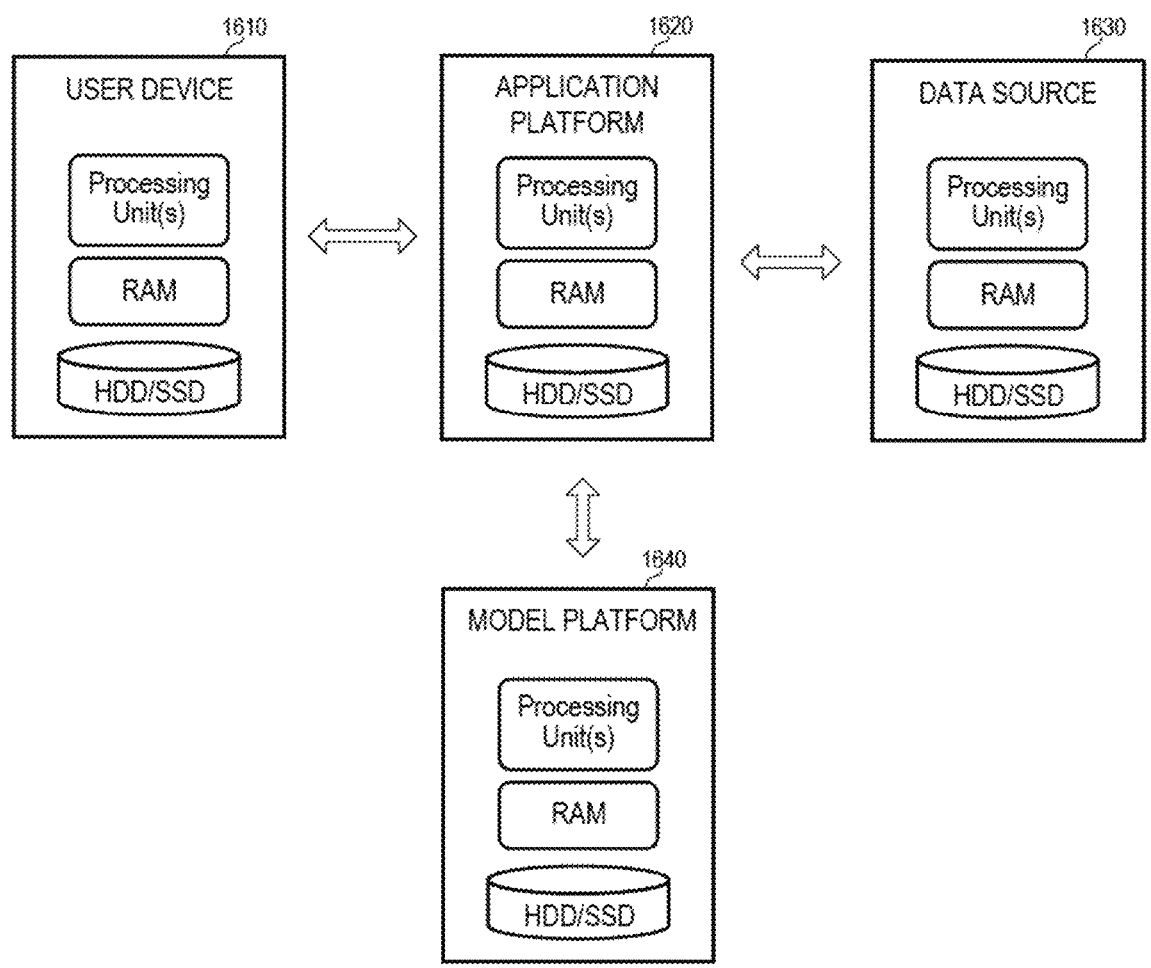
FIG. 16 is a block diagram of a hardware environment providing natural language search of a non-indexed data model according to some embodiments.

FIG. 16 is a block diagram of a cloud-based system according to some embodiments. Application platform 1620, data source 1630 and model platform 1640, may each comprise cloud-based resources, such as virtual machines, allocated by a cloud provider providing self-service and immediate provisioning, autoscaling, security, compliance and identity management features.

User device 1610 may interact with a user interface of an application executing on application platform 1620, for example via a Web browser executing on user device 1610. The user interface may receive a search request including a data model and a natural language description. In response, application platform 1620 may retrieve metadata and sample dimension members of the data model from data source 1630 and forward the query, metadata and dimension members to a text generation model executing on model platform 1640.

Model platform 1640 returns a populated query template including a candidate measure and candidate dimension members. Next, application platform 1620 determines whether the candidates exist in the data model and their identifiers, and uses the query template and the identifiers to generate a query for transmission to data source 1630. Data source 1630 returns a visualization including a result set, and application platform 1620 transmits the visualization to user device 1610 for display thereon.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing program code; and
   one or more processing units to execute the program code to cause the system to:
   receive a natural language query;
   determine a plurality of dimensions of a data model, a plurality of measures of the data model and, for each of the plurality of dimensions, a sample of dimension members of the data model;
   transmit the natural language query, the plurality of dimensions, the plurality of measures and the sample of dimension members to a text generation model;
   receive a candidate dimension member and a matching measure from the text generation model;
   generate a second query including the candidate dimension member and the matching measure;
   transmit the second query to the data model;
   receive a result set from the data model in response to the second query; and
   generate a visualization including the result set.

2. The system of claim 1, wherein reception of the candidate dimension member and the matching measure from the text generation model comprises reception of a populated query template including a candidate filter, the matching measure, and a visualization type.

3. The system of claim 2, wherein generation of the second query comprises:
   generation of the second query based on the candidate filter, the matching measure, and the visualization type.

4. The system of claim 2, wherein generation of the second query comprises:
   querying of the data model for the candidate dimension member;
   reception of an identifier of the candidate dimension member from the data model; and
   generation of the second query based on the identifier of the candidate dimension and the visualization type.

5. The system of claim 4, wherein determination of the plurality of dimensions, the plurality of measures and the sample of dimension members of the data model comprises:
   reception of the plurality of dimensions and the plurality of measures from the data model; and
   querying of the data model for a specified number of dimension members of each of the plurality of dimensions.

6. The system of claim 1, wherein generation of the second query comprises:
   querying of the data model for the candidate dimension member and the candidate measure;
   reception of an identifier of the candidate dimension member from the data model; and
   generation of the second query based on the identifier of the candidate dimension member.

7. The system of claim 5, wherein determination of the plurality of dimensions, the plurality of measures and the sample of dimension members of the data model comprises:
   reception of the plurality of dimensions and the plurality of measures from the data model; and
   querying of the data model for a specified number of dimension members of each of the plurality of dimensions.

8. The system of claim 1, wherein determination of the plurality of dimensions, the plurality of measures and the sample of dimension members of the data model comprises:
   reception of the plurality of dimensions and the plurality of measures from the data model; and
   querying of the data model for a specified number of dimension members of each of the plurality of dimensions.

9. A method comprising:
   receiving a natural language query to search a data model;
   determining a plurality of dimensions of the data model, a plurality of measures of the data model and, for each of the plurality of dimensions, a sample of dimension members of the data model;
   transmitting the natural language query, the plurality of dimensions, the plurality of measures and the sample of dimension members to a text generation model;
   receiving a candidate dimension member and a matching measure of the data model from the text generation model;
   determining whether the candidate dimension member is a dimension member of the data model;

if it is determined that the candidate dimension member is a dimension member of the data model, generating a second query including the candidate dimension member and the matching measure;

transmitting the second query to the data model;

receiving a visualization including a result set from the data model in response to the second query; and presenting the visualization.

10. The method of claim 9, wherein receiving the candidate dimension member and the matching measure from the text generation model comprises receiving of a populated query template including a candidate filter, the matching measure, and a visualization type.

11. The method of claim 10, wherein generating the second query comprises:

generating the second query based on the candidate filter, the matching measure, and the visualization type.

12. The method of claim 10, wherein determining whether the candidate dimension member is a dimension member of the data model comprises:

querying the data model for the candidate dimension member; and receiving an identifier of the candidate dimension member from the data model, and wherein generating the second query comprises generating the second query based on the identifier of the candidate dimension member and the visualization type.

13. The method of claim 12, wherein determining the plurality of dimensions, the plurality of measures and the sample of dimension members of the data model comprises:

receiving the plurality of dimensions and the plurality of measures from the data model; and querying the data model for a specified number of dimension members of each of the plurality of dimensions.

14. The method of claim 9, wherein determining whether the candidate dimension member is a dimension member of the data model a comprises:

querying the data model for the candidate dimension member and the candidate measure; and receiving an identifier of the candidate dimension member from the data model, and wherein the second query is generated based on the identifier of the candidate dimension member.

15. The method of claim 14, wherein determining the plurality of dimensions, the plurality of measures and the sample of dimension members of the data model comprises:

receiving the plurality of dimensions and the plurality of measures from the data model; and querying the data model for a specified number of dimension members of each of the plurality of dimensions.

16. The method of claim 9, wherein determining the plurality of dimensions, the plurality of measures and the sample of dimension members of the data model comprises:

receiving the plurality of dimensions and the plurality of measures from the data model; and querying the data model for a specified number of dimension members of each of the plurality of dimensions.

17. One or more non-transitory media storing program code executable by one or more processing units of a computing system to cause the computing system to:

receive a natural language query;

determine a plurality of dimensions of a data model, a plurality of measures of the data model and, for each of the plurality of dimensions, a sample of dimension members of the data model;

transmit the natural language query, the plurality of dimensions, the plurality of measures and the sample of dimension members to a text generation model;

receive a candidate filter and a matching measure of the data model from the text generation model;

generate a second query including the candidate filter and the matching measure;

transmit the second query to the data model;

receive a result set from the data model in response to the second query; and generate a visualization including the result set.

18. The one or more non-transitory media of claim 17, wherein reception of the candidate filter and the matching measure from the text generation model comprises reception of the candidate filter, the matching measure, and a visualization type, and wherein generation of the second query comprises generation of the second query based on the candidate filter, the matching measure, and the visualization type.

19. The one or more non-transitory media of claim 18, wherein the candidate filter includes a candidate dimension member, and wherein generation of the second query comprises:

querying of the data model for the candidate dimension member;

reception of an identifier of the candidate dimension member from the data model; and generation of the second query based on the identifier of the candidate dimension member and the visualization type.

20. The one or more non-transitory media of claim 17, wherein determination of the plurality of dimensions, the plurality of measures and the sample of dimension members of the data model comprises:

reception of the plurality of dimensions and the plurality of measures from the data model; and querying of the data model for a specified number of dimension members of each of the plurality of dimensions.

* * * * *